Jan. 5, 1954   R. H. WITT   2,664,686
BEATER ASSEMBLY FOR COTTON HARVESTERS
Filed Aug. 6, 1951   3 Sheets-Sheet 1
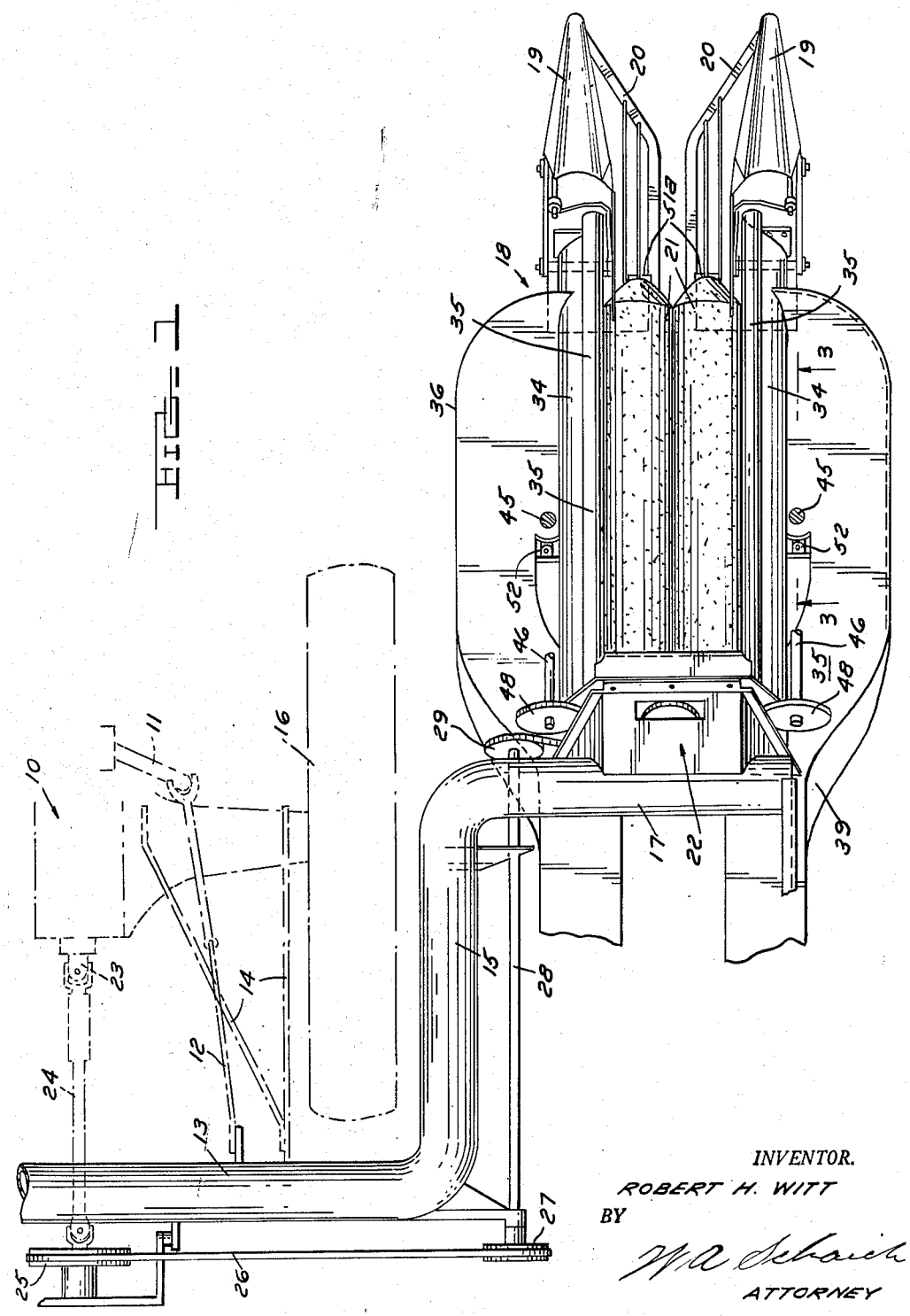
INVENTOR.
ROBERT H. WITT
BY
ATTORNEY

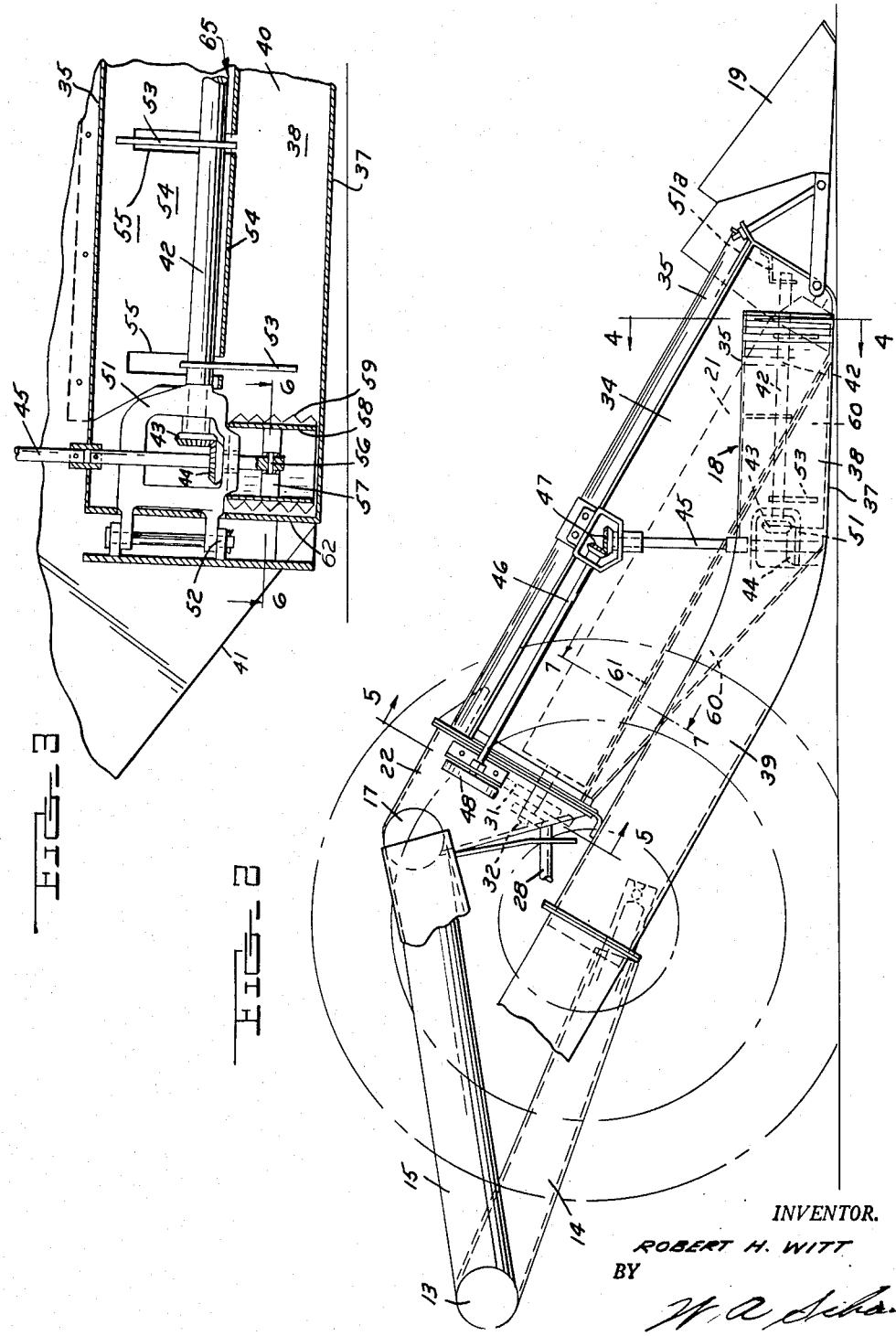

Jan. 5, 1954  R. H. WITT  2,664,686
BEATER ASSEMBLY FOR COTTON HARVESTERS
Filed Aug. 6, 1951  3 Sheets-Sheet 3
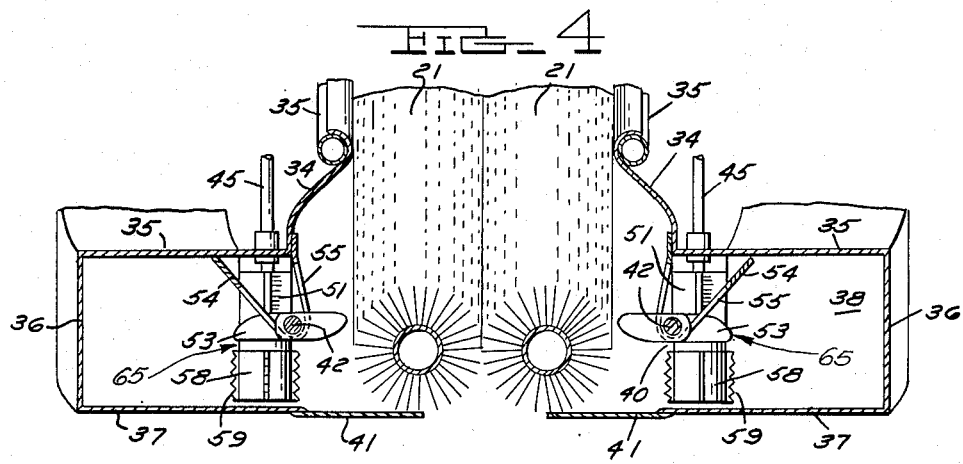
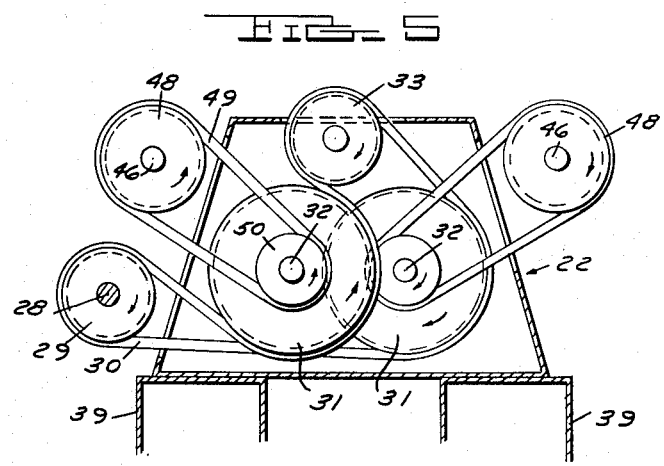
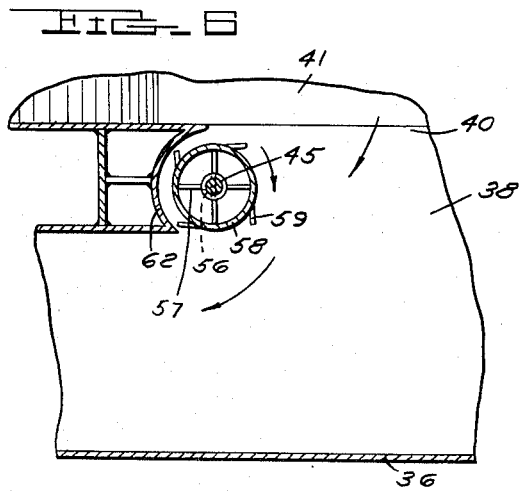
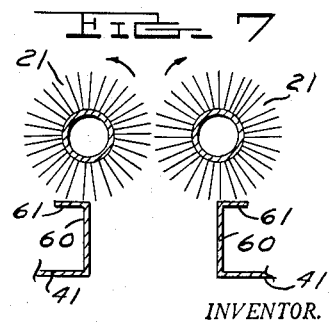
INVENTOR.
ROBERT H. WITT
BY
ATTORNEY Patented Jan. 5, 1954

2,664,686

UNITED STATES PATENT OFFICE 2,664,686

BEATER ASSEMBLY FOR COTTON HARVESTERS

Robert H. Witt, Royal Oak, Mich., assignor to Dearborn Motors Corporation, Birmingham, Mich., a corporation of Delaware Application August 6, 1951, Serial No. 240,566

5 Claims. (Cl. 56—30)

The present invention relates to a beater assembly for a harvesting machine and more particularly to means for preventing the clogging of the conveying system of a stripper-type harvester.

In the mechanical harvesting of cotton, it has been proposed that counter-rotating, laterally spaced and vertically inclined brushes be utilized to strip the cotton bolls from an associated plant. After the bolls have been thus stripped from the plant, the bolls are conducted to a suitable receptacle, such as a wagon, through a pneumatic conveying system having suction intake ports closely adjacent the rolls. In order to insure complete and effective stripping of the cotton bolls, the rolls must have an aggressive action, and it often happens that branches, stalks, leaves and other portions of the plants themselves or weeds are removed by the brushes during stripping of the bolls. Although the pneumatic system may be designed and constructed to readily accommodate the stripped cotton bolls, the concurrently stripped trash often clogs the pneumatic intake ports or other portions of the conveying system. This clogging problem becomes quite serious under certain harvesting conditions, as where harvesting is delayed by adverse weather conditions and the plants have become brittle. Further, certain types and strains of cotton plants are inherently brittle, so as to be unsuitable for conventional stripping operations.

The present invention now provides an improved cotton stripper provided with means for preventing clogging of the pneumatic system by trash other than the cotton bolls. More specifically, the present invention provides a beater assembly located directly at the suction intake ports of the conveying system for chopping or beating stalks and similar trash into relatively small pieces which may more readily pass through the pneumatic conveyor. Also, the beater assembly clears the intake port opening, so as to avoid the piling up of relatively large stalks and branches together with the harvested bolls.

It is, therefore, an important object of the present invention to provide an improved non-clogging stripper-type cotton harvester having a pneumatic boll pickup system.

Another object of this invention is the provision of a beater assembly utilized in combination with a suction intake pneumatic conveyor to prevent clogging of the conveyor by relatively large foreign material introduced thereinto.

It is a further object of the present invention to provide a cotton stripping machine having a rotatable stripping brush and a pneumatic conveyor intake port immediately adjacent thereto, the port having a rotatable beater assembly mounted therein to prevent clogging of the port by relatively large pieces of cotton stalk or branches attempting to enter the same.

Still another important object is the provision of a beater assembly for a cotton stripping machine, the assembly being located at the suction intake port of the machine's pneumatic conveying system to clear the port of relatively large incidently harvested portions of the cotton plants being stripped.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Figure 1 is a fragmentary plan elevational view of a cotton harvesting machine provided with a beater assembly of the present invention;

Figure 2 is a side elevational view of the machine of Figure 1;

Figure 3 is an enlarged fragmentary sectional view taken along the plane 3—3 of Figure 1;

Figure 4 is an enlarged fragmentary sectional view taken along the plane 4—4 of Figure 2;

Figure 5 is an enlarged fragmentary sectional view of the machine taken along the plane 5—5 of Figure 2;

Figure 6 is a fragmentary sectional view taken along the plane 6—6 of Figure 3; and Figure 7 is a fragmentary sectional view taken along the plane 7—7 of Figure 2.

As shown on the drawings:

In Figure 1, reference numeral 10 indicates generally a tractor of well-known type having a pair of power-liftable rock arms 11 (one such rock arm only being shown) attached through draft links 12 to a tubular frame element 13 mounted rearwardly of the tractor. The tractor is also provided with pairs of trailing stabilizer links 14 likewise secured to the tubular member 13. An intermediate portion 15 of the tubular member 13 is forwardly displaced to lie alongside one of the tractor tires 16, and the freely extending end 17 of the tubular member is angularly displaced to extend laterally of the tractor 10 for supporting a cotton stripper 18.

The stripper 18 includes a pair of laterally spaced, forwardly extending snouts 19 having laterally inwardly extending guides 20 for guiding cotton plants therebetween. The stripper is also provided with a pair of counter-rotatable stripping brushes 21 which are axially parallel and peripherally closely spaced for removing the cotton bolls from the plants passing therebetween. The stripping rolls are journaled within a frame housing indicated generally at 22 and supported from the terminal portion 17 of the frame member 13. The counter-rotating rolls 12 are driven from a power-take-off 23 on the tractor 10 which is drivingly connected, as through a shaft 24, to a first sheave 25. The sheave 25, through a V-belt 26, drives a second sheave 27 which, in turn, drives a longitudinal shaft 28 upon which a sheave 29 is mounted. The sheave 29 (Figure 5) drives another V-belt 30 lapped about sheaves 31 positioned on the upper ends of the stripper roll spindles 32. Inasmuch as the spindles 32 rotate in opposite directions, an idler sheave 33 is provided for the V-belt 30.

The rolls 21 are directly enclosed within a casing sub-section 34 (Figure 4) which is suspended from a pair of parallel, laterally spaced pipe sections 35 carried by the frame portion 17. Each half of the casing 34 is provided with a lower laterally outwardly extending flange 35, a down turned flange 36, and a bottom flange 37 defining an interior suction intake conduit 38 extending generally horizontally immediately adjacent the lower extremities of the associated brush 21. The intake conduits 38 blend into upwardly and rearwardly extending conduit sections 39 forming the intake portion of a combined suction intake and pressure discharge pneumatic conveying system.

From Figure 4, it will be noted that each horizontal intake conduit section 38 is provided with an inner, generally rectangular suction intake port 40 adjacent the lowermost portion of the associated brush 21, so that the suction generated within the conduit 38 by operation of the conveying system is sufficient to cause cotton bolls from the stripping brush 21 to be laterally drawn into the conduit 38 through the port 40. A lower wall 41 underlying each of the brushes 21 provides a lateral extension for the bottom conduit flange 37 to prevent loss of bolls about the brushes 21.

Within each of the ports 40, there is provided a beater assembly 65 including longitudinally extending shaft 42 driven by beveled gear 43 (Figure 3) keyed thereto and meshing with a second beveled gear 44 mounted upon an upwardly extending shaft 45. Shaft 45 is driven from a rearwardly extending shaft 46 through bevel gears 47 (Figures 2 and 5), the shaft 46 in turn being driven by a sheave 48 lapped by a V-belt 49 from a sheave 50 located on the spindle 32 of the associated brush 21. The shaft 42 is journaled at its rear end in a bracket 51 which also journals the vertically extending shaft 41, the bracket 51 being supported on a hanger 52, and the forward extremity of the shaft 42 is journaled in a bracket 51a at the extreme forward end of the casing section 34. Along the length of the shaft 42 are rigidly mounted a plurality of beater arms 53 projecting radially from the shaft and adapted to rotate within the port 40. The shaft 42 is partially surrounded by a curved shield 54 secured, as by welding, to an upper portion of the housing 34 and extending downwardly therefrom about the axle 42 and then rearwardly into the conduit 38. The shield 54 is slotted, as at 55, along its length to accommodate rotation of the beaters 53. Thus, the shields 54 serve to at least partially close the ports 40, thereby increasing the suction effect of air drawn inwardly and upwardly through the conduit 38. The vertically extending shaft 45 is pinned, as at 56, to a radial spider 57 supporting a cylindrical collar 58 having radially extending peripheral teeth 59. It will be noted from Figures 3 and 6 that the teeth 59 are vertically serrated and that the teeth project tangentially from the collar 58 for a purpose to be hereinafter more fully described.

From Figure 7, it will be seen that the brushes 21 overlie an upstanding terminal flange 60 formed integrally with the floor plate 41, the flange 60 terminating in an inturned lip 61 projecting inwardly toward the intake conduit 38.

Operation

In the operation of the cotton stripper illustrated in the drawings, the tractor 10 is steered and operated so that the row-planted cotton plants pass between the guide snouts 19 and the lateral guide bars 20. The inclination of the bars will be sufficient to guide any misaligned plants into the desired intermediate space where the plants next pass between the counter-rotating stripper rolls 21. Due to the rearward and upward inclination of the brushes 21, the lower portions of the plant are first contacted by the brushes with the upper portions of the plant being contacted by the brushes as the machine progresses forwardly. The stripper rolls are in peripheral contact with one another, and an effective wiping or brushing action is exerted upon the plants to remove the bolls therefrom. During stripping of the bolls, it has been found that some portions of the plant, either in the form of stalks or branches, will be removed from the plant by the agressive brushing action. Also, partially broken or grounded branches will be stripped and/or picked up by the brushes so that effective stripping is obtained.

The bolls and incidentally harvested trash will be peripherally engaged by the rolls and carried or centrifugally flung thereby outwardly toward the intake conduits 38. The differential pressure conditions existing in the suction intake port 40 will create a draft of air rearwardly and upwardly within the conduits 38 to convey the harvested material to the provided receptacle. Under adverse operating conditions, as for example in dry and/or brittle plants, relatively large portions of the plant may be stripped by the brushing action, and it is possible that these plant portions may tend to partially clog or block the intake ports 40. However, the beater assembly 65 including the shaft 42 and the elements 53 will prevent such clogging, since the rotating beater elements 53 will impinge upon such plant portions and shred the same, so that their entry through the port 40 will be facilitated. Also, the rotating beaters 53 will prevent the massing of the cotton bolls themselves at the intake port 40, as in extremely high yield cotton, so that free passage of harvested material through the ports is insured.

The shield 54 effectively closes a portion of the otherwise open inward side of the conduit 38, so that the over-all size of the port 40 is reduced and the effective differential pressure at the port is increased. Further, the shield 54 presents a smooth surface about the shaft 42, so that flow of harvested material through the port is unimpeded.

The flow of harvested material through the port 40 is further insured by the rotatable collar 58 and the teeth 59 carried thereby. It will be noted that the collar 58 specifically located at the rear extremity of the port 40, as determined by the housing shield 62 (Figure 6) located at the collar 58 in adjacent and conforming relationship thereto. If the toothed collar 58 were not provided, it might be possible for branches, stalks and the like to be jammed against that portion of the housing defining the rear extremity of the port and severe clogging could result. However, any material in the vicinity of the port extremity will be engaged by the tangential teeth 59, and the teeth will fling such material inwardly into the interior of the conduit 38.

As illustrated in Figure 4, the right hand brush 21 rotates in a clockwise direction and the left hand brush 21 rotates in a counterclockwise direction. Inasmuch as the harvested bolls are conveyed by the periphery of the brushes into position to be carried into the intake conduit 38, some of the bolls may tend to cling to the brushes until centrifugal force exerted thereon would normally throw the bolls into the opening underlying and between the brushes. However, by the provision of the upstanding flange 60 and its inturned extremity 61, the bolls tending to be flung between the brushes will strike the flange so as to be retained within the casing 34. It will be understood that the upstanding flange 60 directly underlies and conforms to the periphery of the brushes 21 throughout their entire axial length.

From the foregoing detailed description and operation summary, it will be understood by those skilled in the art that the present invention provides an improved form of cotton stripper whereby clogging of the pneumatic conveyor system is prevented and steady flow of harvested material through the intake conduit is insured. Further, means are provided for positively preventing the flinging of cotton bolls centrifugally into the space between the brushes.

It will, of course, be understood that various details of construction may be varied through a wide range without departing from the principles of this invention and it is, therefore, not the purpose to limit the patent granted hereon otherwise than necessitated by the scope of the appended claims.

I claim:

1. In a cotton harvesting machine having a suction intake port and a juxtapositioned rotatable stripping brush for stripping cotton bolls from a plant contacted by said brush, a beater assembly located at said port to prevent clogging of the same by trash, comprising a shaft extending longitudinally of said port, means carried by said machine journaling said shaft for rotation, means for rotating said shaft in a direction opposite to the direction of rotation of said brush, and radially extending axially spaced beater elements on said shaft.

2. In a cotton harvesting machine having a suction intake port and a juxtapositioned rotatable stripping brush for stripping cotton bolls from a plant contacted by said brush, a beater assembly located at said port to prevent clogging of same by incidently harvested portions of said plant comprising a shaft extending longitudinally of said port and located intermediate the transverse dimension thereof, means journaling said shaft for rotation, radially extending axially spaced beater elements mounted on said shaft for rotation therewith, and a shield partially lapping said shaft and projecting therefrom to effectively close a portion of said port, said shield having slots therein to accommodate rotation of said beater elements.

3. In a cotton harvesting machine having a flare sheet defining a suction intake port and journaling a juxtapositioned rotatable stripping brush for stripping cotton bolls from a plant contacted by said brush, a beater assembly located at said port to prevent clogging of the same comprising a shaft extending longitudinally of said port and located intermediate the vertical dimension thereof, means carried by said flare sheet journaling said shaft for rotation, radially extending axially spaced beater elements carried by said shaft for rotation therewith, and a shield carried by said flare sheet and having an intermediate portion partially lapping and closely conforming to said shaft and upwardly deflected end portions secured to said flare sheet adjacent said port and serving to block off a portion of said port, said shield having slots therein to accommodate rotation of said beater elements and serving to materially reduce the size of said port for facilitating the movement of harvested material into said port.

4. In a cotton stripping machine, a flare sheet journaling for rotation a rearwardly and upwardly inclined stripping brush, and defining a suction intake conduit laterally spaced from the forward lower end of said brush, said conduit having a port establishing communication between said brush and said conduit for the flow of harvested material therethrough, a beater assembly comprising angularly disposed and commonly driven shafts journaled by said flare sheet and projecting into said port for rotation therein, a first of said shafts extending longitudinally of said port and a second of said shafts extending transversely of said port adjacent one extremity thereof, a shield secured to said flare sheet at said port to overlie a portion of said port and partially lap said first of said shafts, radially extending beater elements on said first of said shafts for rotation therewith, said shield having slots therein aligned with the paths of rotation of said beating elements to accommodate rotation thereof, and tangentially projecting beater elements carried by the second of said shafts and disposed outside said shield, said beating elements in combination serving to prevent clogging of said port and to centrifugally fling harvested material into said intake conduit.

5. In a cotton harvesting machine, a cotton boll stripping and pickup assembly comprising a casing having an open forward end, a pair of laterally spaced rearwardly extending suction pickup conduits having inwardly opening ports adjacent the open end of said casing, parallel rearwardly extending stripping brushes having their forward ends interposed between said conduits and substantially aligned with said ports, means for rotating said brushes, a longitudinally extending shaft at each of said ports, a transversely extending shaft at the rear end of each of said ports, means carried by each of said conduits journaling said shafts for rotation, means for rotating said shafts in synchronism with one another and with the associated brush, radially projecting beater blades on said longitudinal shafts for rotation therewith, and tangentially extending beater blades on said transverse shafts, the blades on each of said shafts being rotatable therewith to centrifugally fling harvested material into said conduits and also being effective to prevent clogging of said ports.

ROBERT H. WITT.

References Cited in the file of this patent

UNITED STATES PATENTS

| Number | Name | Date |
|---|---|---|
| 1,722,747 | Hentz | July 30, 1929 |
| 2,484,524 | Nisbet, Sr. | Oct. 11, 1949 |
| 2,538,454 | Hart, Jr. | Jan. 16, 1951 |